United States Patent [19]

Gvoich et al.

[11] Patent Number: 4,601,467
[45] Date of Patent: Jul. 22, 1986

[54] VALVE MODULE AND APPARATUS THEREFOR

[76] Inventors: William Gvoich, 281 Rainbow Dr., Hamilton, Canada, L8K 4G3; John B. Rogers, R.R. #1-Hunts Point, Queens County, Nova Scotia, Canada

[21] Appl. No.: 660,519

[22] Filed: Oct. 12, 1984

[30] Foreign Application Priority Data

Feb. 28, 1984 [CA] Canada ................................. 448487

[51] Int. Cl.⁴ ............................................. A63B 21/00
[52] U.S. Cl. ................................... 272/130; 137/269.5
[58] Field of Search ............... 272/72, 130; 137/512.4, 137/269.5, 614.18; 273/55 R

[56] References Cited

U.S. PATENT DOCUMENTS

| | | | |
|---|---|---|---|
| 528,378 | 10/1894 | McGee | 137/269.5 X |
| 767,008 | 8/1904 | Pelletier et al. | 272/130 |
| 1,707,449 | 4/1929 | Rodale | 272/130 X |
| 2,068,578 | 1/1937 | Strowach | 272/130 |
| 3,599,657 | 8/1971 | Maldaus | 137/512.4 X |
| 3,702,188 | 11/1972 | Phillips et al. | 272/130 |
| 4,241,913 | 12/1980 | Zwayer et al. | 272/130 |
| 4,257,593 | 3/1981 | Keiser | 272/130 |
| 4,357,010 | 11/1982 | Telle | 272/130 X |
| 4,478,412 | 10/1984 | Muir | 272/130 |

FOREIGN PATENT DOCUMENTS 2833924 2/1980 Fed. Rep. of Germany ....................... 137/614.18

Primary Examiner—Richard J. Apley
Assistant Examiner—Robert W. Bahr
Attorney, Agent, or Firm—Riches, McKenzie & Herbert

[57] ABSTRACT

This invention relates to a new valve module which is particularly suitable for use in an exercise device. The valve module comprises a housing, at least one entrance conduit to allow air to enter the valve module, at least one exit conduit to allow air to exit from the valve module and a pair of valves to control the flow of air through the module. The module is particularly suitable in a variety of exercise devices used in the field of muscle development, exercise and rehabilitation. These devices including the novel module allow for isometric, concentric and eccentric contractions and allow for differing velocities of exercise movement. These devices may be manufactured and sold for home use and require no auxiliary fluid supply source and are completely self contained.

22 Claims, 13 Drawing Figures

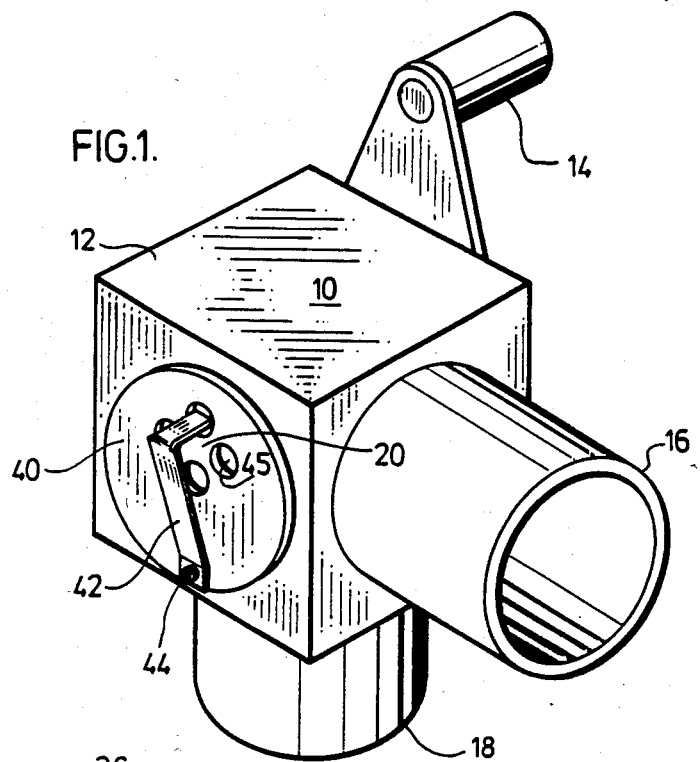
FIG.1.
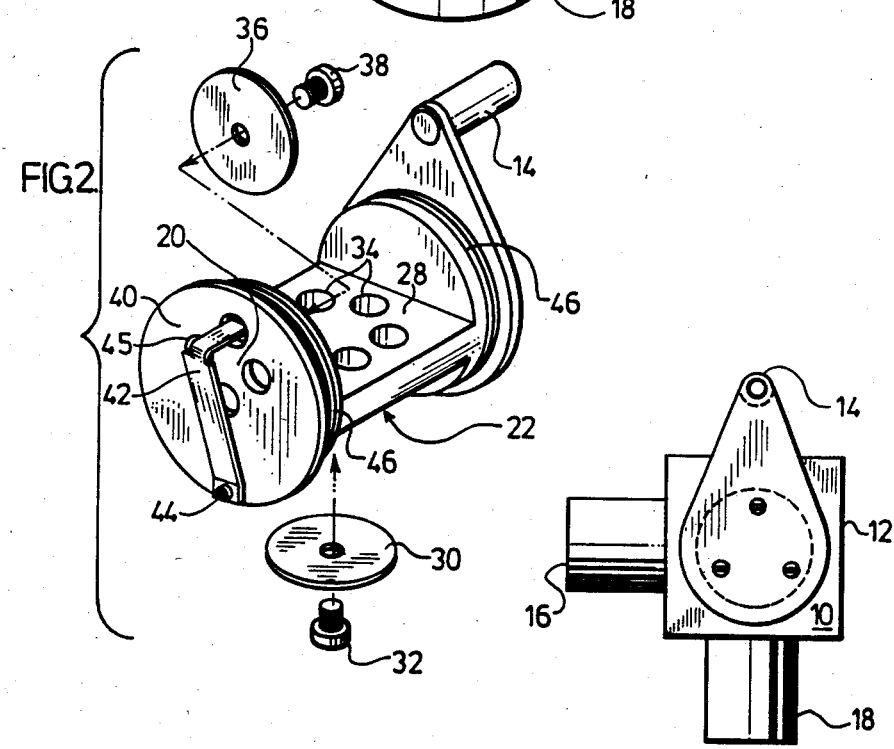
FIG.2.
FIG.3.

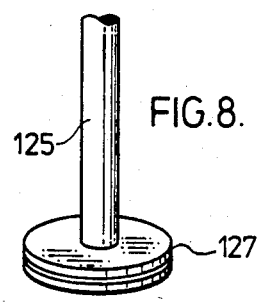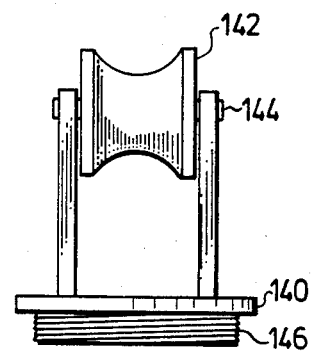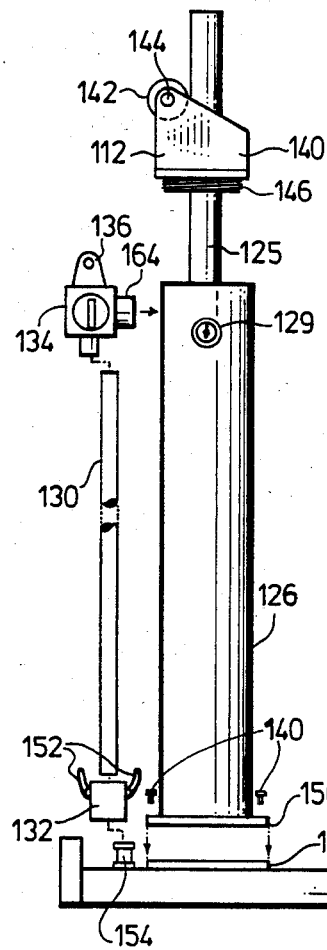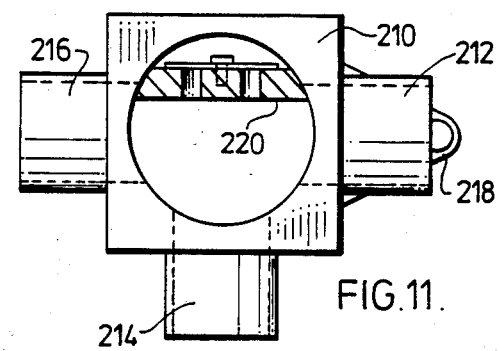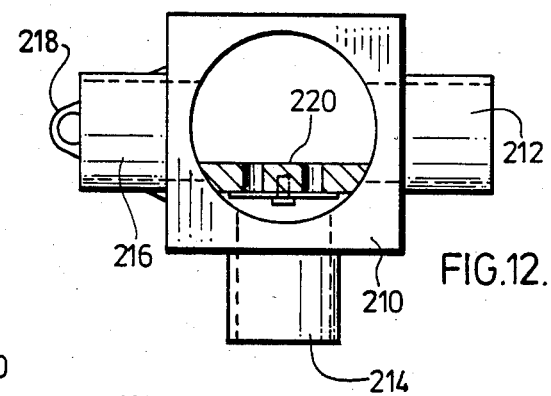

VALVE MODULE AND APPARATUS THEREFOR

BACKGROUND OF THE INVENTION

1. Field of the Invention

This invention relates to a new valve module which is particularly suitable for use in an exercise device. These devices find particular application in the field of muscle development, exercise and rehabilitation. The new valve module is suitable for a variety of these devices.

2. Description of the Prior Art

In designing strength or exercise training equipment, three types of muscle contractions must be considered. These three types include isometric or static contractions, concentric or positive contractions, and eccentric or negative contractions.

Isometric contractions are contractions in which the length of the muscle remains unchanged while the muscle develops tension. These types of contractions occur when a muscle applies a force against an immovable object. A concentric contraction occurs when the muscle shortens as it develops tension and overcomes the resistance. In an eccentric contraction, the external resistance overcomes the active muscle and the muscle lengthens while developing tension.

The devices of the prior art take into account, some or all of these types of muscle contractions. The devices which only take into account some of the foregoing types of contractions, do not make maximum use of the exercise. If a device or apparatus can take into account all three types of contractions, much more increased development of the muscle will occur during a specific exercise.

The equipment on the market today which in fact takes into account all three types of contractions, is extremely cumbersome and expensive. As a result, this equipment is found only at institutions, health clubs, rehabilitation centers and the like. As a result, they do not have wide-spread use by individuals who require a light-weight, inexpensive and portable apparatus which is suitable for home use and also use at training facilities.

A further drawback of the prior art devices is that they do not provide for differing velocities of movement during the exercise. In other words, the exercise is performed at a continuous rate of speed which restricts the ability of the person doing the exercises from achieving maximum benefit from the exercise. In designing strength training equipment, it is an important consideration to consider the strength curve which is defined as the variation in strength that a muscle undergoes through a range of movement. While different systems have incorporated some aspects of variable resistance in the system, most systems have not provided sufficient means to correlate variable resistance with the strength curve.

One such prior art device is illustrated in U.S. Pat. No. 3,822,599 issued on July 9, 1974 to Brentham. This device is based on the concentric contractions of muscles and does not consider all three types of muscle contractions as set out hereinbefore. Another device by the same inventor, as illustrated in U.S. Pat. No. 4,066,259 granted on Jan. 3, 1978, provides for concentric contractions. Other examples of prior art devices are those available from Keiser which use an air compressor to provide resistance to the exercise movement. The devices require a power source, commonly an electrical power source to run the compressor and thus, are quite limited in use as well as being quite expensive and cumbersome. They also suffer from mechanical breakdown and require a considerable amount of normal servicing.

SUMMARY OF THE INVENTION

Accordingly, it is an object of the present invention to at least partially overcome these disadvantages by providing a new valve module suitable for use in a variety of exercise devices, which devices will produce isometric, concentric and eccentric contractions in a muscle, and which will allow for differing velocities of exercise movement.

A further object of the present invention is a design of an exercise device incorporating the new valve module therein, which device is simple in design, produces isometric, concentric and eccentric contractions in a muscle, and which will allow for differing velocities of exercise movement.

It is a further object of this invention to provide a novel leg exercise apparatus which is simple in design and which may be manufactured and sold for home use.

It is a yet further object of the present invention to provide a light-weight and portable leg exercise apparatus.

A still further object of the present invention is to provide a novel leg exercise apparatus which includes variable resistance and which can be operated to provide maximum muscle strengthening ability in correlation to the strength curve of the preselected muscle.

A still further object of the present invention is to provide a leg strengthening apparatus which uses no auxiliary fluid supply source and is completely self-contained and easy to operate, yet completely safe.

To this end, in one of its aspects, the invention provides a valve module comprising a housing, at least one entrance conduit to allow air to enter the valve module, at least one exit conduit to allow air to exit from the valve module, and a pair of valves to control the flow of air through the module.

In another of its aspects, the invention provides a leg strengthening apparatus which comprises an air reservoir;

a valve means adapted to control the flow of air into and out of said reservoir;

a cylinder in communication with said valve means, said cylinder having a piston slidably disposed therein;

actuating means adjustably secured to said piston.

BRIEF DESCRIPTION OF THE DRAWINGS

FIG. 1 is a perspective view of the valve module of the present invention.

FIG. 2 is an exploded view of the components of the valve module of FIG. 1.

FIG. 3 is a side elevational view of FIG. 1.

FIG. 8 is a sectional view of the piston and a portion of the piston rod.

FIG. 9 is an exploded side elevational view of the device of FIG. 6.

FIG. 10 is an end elevational view of the wheel, the wheel housing and the cylinder cap of the device of FIG. 6.

FIG. 11 is a side elevational view of the valve module in the exercise mode of the present invention to be used with two conduits in a multi-press and prone bench press FIG. 12 is a side elevational view of the valve module of FIG. 11, in the priming mode.

DESCRIPTION OF THE PREFERRED EMBODIMENTS

Figure 4:
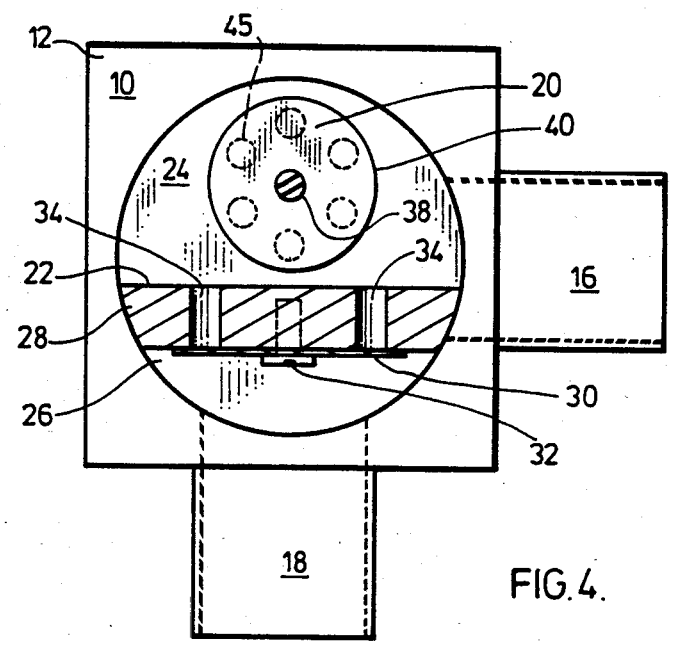
FIG. 4 is a side sectional view of the valve module in the priming position.

The new valve module 10 comprises a housing 12 to which is secured handle 14 as shown in FIG. 3. A first conduit 16 extends from one face of the module 10 and communicates with the interior thereof. A second conduit 18 extends from a second face and also communicates with the interior of the housing 12. A pressure release and priming intake unit 20 is located on a third face of the housing 12. Its specific structure and use will be described hereinafter.

Inside the housing 12 is located a valve seat 22 which is rotatable about a central axis by the movement of handle 14. The seat 22 divides the interior of the valve module 10 into a first chamber 24 and a second chamber 26 which, depending upon the rotational orientation of the seat 22, will determine the valve function. In the priming position shown in FIG. 4, first chamber 24 communicates with conduit 16 and second chamber 26 communicates with conduit 18. In the operative position shown in FIG. 5, chamber 24 is in communication with conduit 16 and conduit 18 and chamber 26 is not involved.

The first chamber 24 is separated from the chamber 26 by a vented valve disc mount 28 which has a rubber valve disc 30 secured to one surface by means of a screw 32 or similar means. Channels 34 extend through the valve disc mount 28 and allow the first chamber 24 to communicate with the second chamber 26 as will be explained.

A pressure release and priming intake valve unit 20 is secured to the exterior wall of housing 12 and communicates with chamber 24. The pressure release and priming intake valve unit 20 comprises a second rubber valve disc 36 secured by screw 38 in a second vented valve disc mount 40. An air pressure release spring lever 42 is mounted on the exterior of the unit 20 by screw 44 in the vented valve disc mount 40. Channels 45 allow for communication between the chamber 24 and the exterior of the device. Air tight seals are achieved by use of "O-rings" 46 such that no leakage of air occurs between the respective chambers.

The explanation of the use and operation of the new valve module will now be explained, in conjunction with a new leg exercise device. As stated hereinbefore, the new valve module is suitable for use with a variety of exercise devices. The valve module may be modified to suit each particular device and the objects of the present invention include the new valve module itself, as well as the exercise machines in which it may be incorporated.

The present inventors have designed a new leg exercise device or apparatus which incorporates the valve module therein. The apparatus consists essentially of an air reservoir, a valve means adapted to control the flow of air into and out of the reservoir, a cylinder in communication with the valve means and a piston slidably disposed in the cylinder and extending outwardly from one end of the cylinder, and actuating means adjustably secured to the piston and adapted to apply resistance against its movement.

Figure 6:
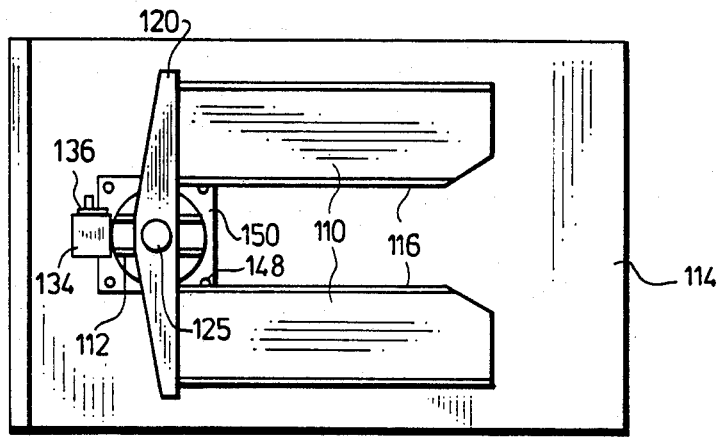
FIG. 6 is a top plan view of a new leg exercise device using the module of the present invention.
Figure 7:
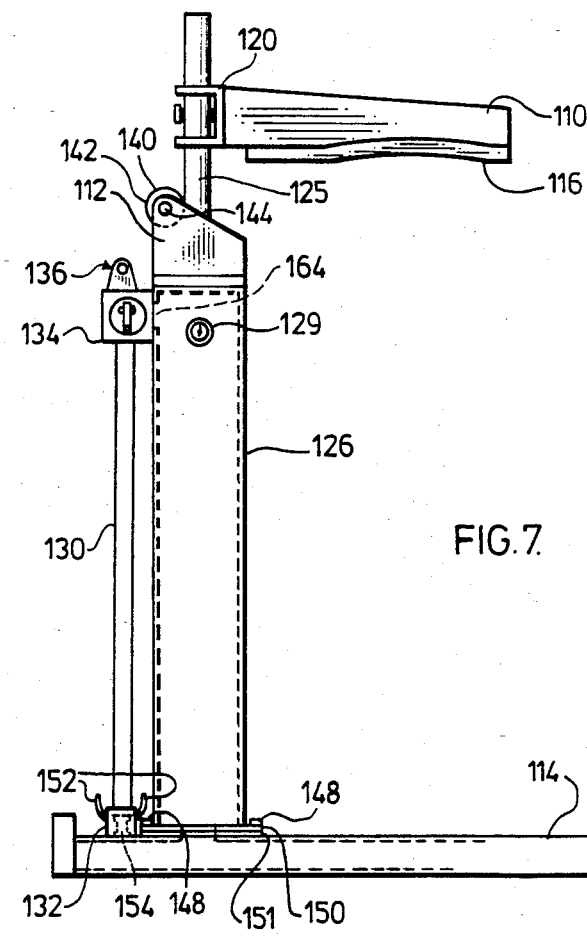
FIG. 7 is a side elevational view of the device of FIG. 6.

Referring now to FIGS. 6 and 7, the air reservoir comprises a stand 114 and an elongated tube 130 in communication therewith. The stand 114 is hollowed out so that air can be retained therein. The stand 114 also serves as a platform upon which the operator can stand when using the apparatus and it may be made of any suitable material.

The tube 130 is secured to the stand 114 by first bracket 132 and it communicates with the interior of the stand 114. Thus, there is free flow of air between the tube 130 and the stand 114.

The valve means comprises a valve 134, the operation of which is controlled by handle 136. A second tube 164 is provided to connect the valve 134 to a work cylinder 126.

The work cylinder 126 includes a piston as shown in FIG. 8 which comprises a piston rod 125 and a piston seal 127. The piston is slidably disposed within the work cylinder 126 and the piston rod 125 extends above the top of the cylinder 126 as shown in FIG. 7.

The actuating means comprises a pair of shoulder rests 110 which are secured to the piston rod 125 by bracket 120 in any well known manner. The shoulder rests 110 are generally padded with padding 116 on the undersurface thereof to increase the comfort of the user when the apparatus is in use. While the padding 116 is not necessary, it is generally preferred to ease the strain on the shoulders. The undersurface of the shoulder rests 110 are generally sloped to correspond to the natural slope of the users shoulders.

The shoulder rests 110 extend horizontally outwardly from the piston rod 125 and are secured thereto by an adjustable bracket 120. The bracket may be an integral part of the shoulder rests 110 or it may be a separate component. The height of the shoulder rests 110 is completely adjustable to accommodate different heights of operators. Rod 125 may also be adjustable in height if desired, by any well known means such as being constructed of a plurality of interlocking telescoping pieces.

As shown in FIG. 9, the cylinder 126 is mounted on stand 114 by a pair of mounting plates 150, 151, the former being secured to the base of the cylinder 126 and the latter being secured to the top of the stand 114. Bolts 148 extend through the plate 150 into plate 151 to secure the cylinder 126 to the stand 114.

A wheel housing and cylinder cap 140 is provided on the top of the cylinder 126. This housing 140 houses wheel 142 upon which piston rod 125 travels. The wheel 142 acts as a guide to ensure proper orientation of the piston rod 125.

FIG. 9 shows an exploded view of the valve means, the air reservoir and the cylinder. Reference is also made to FIG. 10 which shows an end elevational view of the wheel 142 and the wheel housing and cylinder cap 140. Wheel 142 is mounted on axle 144 in wheel housing 140. The wheel housing 140 has a seal 146 attached to the undersurface thereof which seals the cylinder 126.

Tube 130 is mounted onto stand 114 by bracket 132 which in this embodiment, comprises a pair of toggle arms 152 with a cam seal (not shown) inside bracket 132. When placed over spindle 154, the toggle arms 152 are moved upwardly to the desired position to secure bracket 132 to spindle 154. Thus, tube 130 is retained in open communication with the interior of the stand 114.

An air pressure gauge 129 is mounted on the work cylinder 126 as shown in FIG. 7 and allows the user to quickly ascertain the amount of air pressure in the work cylinder 126 at any given time.

The operation of the apparatus will now be explained in detail. The operator of the device first adjusts the height of the shoulder rests 110 such that they contact the shoulders in the squatting position while the operator is standing on the stand 114.

The handle 136 (referred to as handle 14 in FIGS. 1, 2 and 3) is then moved which turns the valve seat 22 to the priming position as shown in FIG. 4. In one embodiment, the seat has an indicator attached thereto and the indicator is located on the outside surface of the housing to inform the operator that the seat is in either the priming position or the operating position.

Once the handle 136 is moved to the priming position, the valve seat 22 is orientated as shown in FIG. 4. In this position, first chamber 24 is in partial communication with first conduit 16 which communicates with work cylinder 126 via tube 164. Although FIG. 9 shows tube 164, such tube 164 is not necessary. If desired, first conduit 16 may connect directly to the work cylinder 126. First chamber 24 communicates with second chamber 26 by the action of the vented valve disc mount 28 which in turn communicates with second conduit 18, tube 130 and stand 114 which serves as a reservoir.

The operator now proceeds to load or charge the apparatus in the following manner. The operator pushes upwardly on the shoulder rests 110 which causes the piston rod 125 to move upwardly thus reducing the volume in the work cylinder 126 above the piston seal 127 and below seal 146. This causes a positive pressure within the system and urges the second rubber disc valve 36 to seal shut thereby preventing any air loss through channels 45. As the second rubber valve disc 36 is forced closed, the air pressure causes rubber valve disc 30 to move away from valve seat 22 thus opening channels 34 and allowing air to move to the storage platform 114 via second conduit 18 and tube 130.

The shoulder rests 110 are then pulled downwardly by the operator which moves the piston rod 125 downwardly into the work cylinder 126. This increases the volume of the cylinder between seals 127 and 146 creating a negative pressure in the system. The negative pressure pulls the rubber valve disc 30 towards the valve seat 22 and is sealed thereto. The second rubber disc valve 36 is urged inwardly due to this negative pressure and air is pulled into the system through channels 45 into conduit 16, and into the work chamber 126.

The operator then raises the shoulder rests 110 and the process is repeated thereby increasing the amount of air stored in the stand 114. By repeating the process several times, the system is charged to the desired level. The amount of the pressure of the air in the system determines the amount of resistance in the apparatus and thus allows for complete adjustability of this parameter for muscle development.

Figure 5:
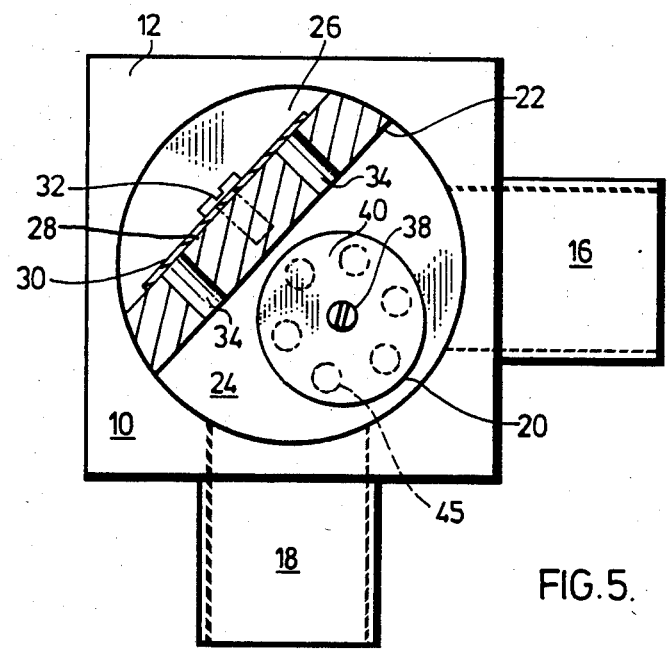
FIG. 5 is a side sectional view of the valve module in the operative position.

When the system is charged or loaded to the desired level, the handle 136 is turned to the operating position which rotates the valve seat 22 to the position as shown in FIG. 5. In this position, there is an open channel from the stand 114, through tube 130, through second conduit 18, through first chamber 24, through first conduit 16 through second tube 164, into the work cylinder 126 where the air pressure can act upon the piston and the piston seal to provide resistance for the operator.

Since the end of the piston rod 125 in work cylinder 126 has an air-tight seal 127 on its lower end, no air from the system will travel to the work cylinder 126 below the end of the piston rod. As the operator does his exercise by pressing upwardly on the shoulder rests 110 he must force the air back through the system to the stand 114. This is caused by the action of moving the piston rod 125 by moving the shoulder rests 110. The degree of resistance to this exercise is determined by the amount of pressure in the system which is created by charging the system. When the operator is fully erect, the air pressure will tend to force the piston rod 125 downwardly in the work cylinder 126. By resisting the return of the piston rod 125, the operator creates exercise in the downward movement of the shoulder rests 110 as well as the upward movement thereof.

When the operator wishes to release some or all of the pressure in the system, he merely presses in spring lever 42 which forces the second rubber valve disc 36 inwardly allowing release of the pressure through channels 45.

The present device has effectively allowed for all three types of muscle contractions. If the pressure in the system is built up to a point where the operator cannot move the shoulder rests upwardly because of the air pressure in the system being exerted in the opposite direction, by forcing upwardly on the shoulder rests 110, the operator causes isometric contractions of his muscles.

Concentric contractions are achieved by maintaining the pressure in the systems at a level wherein the operator can press the shoulder rests 110 upwardly but against a substantial force. In this case, the operator's muscles' contract concentrically. In the downward stroke of the piston rod caused by the increased pressure in the system, the operator tries to resist this movement and thus causes eccentric contractions of his muscles.

It is a further advantage of the system that it is rather simple in manufacture and thus, of reduced costs. It is made of light material and thus, the whole apparatus can be portable and moved to the appropriate training sites.

The system may be charged to the individual specification of the operator, thus allowing for variable resistance in the system. The present invention also allows for biomechanical accommodation, that is, it allows for a variation in the resistance in the system in conjunction with the strength curve required by the particular exercise and by the particular athlete. As the operator moves the shoulder rests 110 upwardly towards the top of its travel, the amount of storage space for the air in the system is reduced thus increasing the resistance in the system. By doing so, the resistance in the system varies over the range of the exercise itself which produces improved muscle training and improved specificity of training.

The present invention is easy to operate and provides an excellent leg exerciser. The operator first adjusts the handle 136 to the priming position and then adjusts the shoulder rests to the correct height. He then bends his knees and places his shoulders underneath the shoulder rests. The operator then stands straight up raising the shoulder rests to the top of their travel, then pulls the shoulder rests 110 downwardly to the bottom of their travel. This motion is repeated until the apparatus is primed to the desired pressure. The operator then turns the handle 136 to the operating position and performs the desired exercise.

A particular advantage of this apparatus is that it allows the operator to warm-up at the same time as priming the machine. Thus, as the pressure of the air is increased in the apparatus, the operator becomes progressively "warmed-up" and is ready to do his exercises.

The valve module of the present invention may also be adapted for use with other exercise devices. For example, the valve module may be used with any exercise device which requires two work cylinders, such as a multi-press or prone bench press unit. With some of these applications, there will be three conduits attached to the valve module, two of which are connected to two work cylinders and one of which is attached to the storage cylinder.

Such an example is shown in FIG. 11 as 12 which disclosure an embodiment of the valve module for use with a multi-press and prone bench press unit. In this embodiment, FIG. 11 shows the module 210 in the operative position. There are three conduits, 212, 214 and 216 which allow for the free flow of air through the module. In the priming mode as shown in FIG. 12, the handle 218 is rotated 180° such that the flow through conduit 214 is controlled by the valve seat 220 which has the same structure as valve seat 22 of FIG. 2. The difference with this structure is the addition of conduit 216 which is in communication with a second work cylinder. The operation, storage and priming is the same as with the module disclosed in FIGS. 1 to 10.

Figure 13:
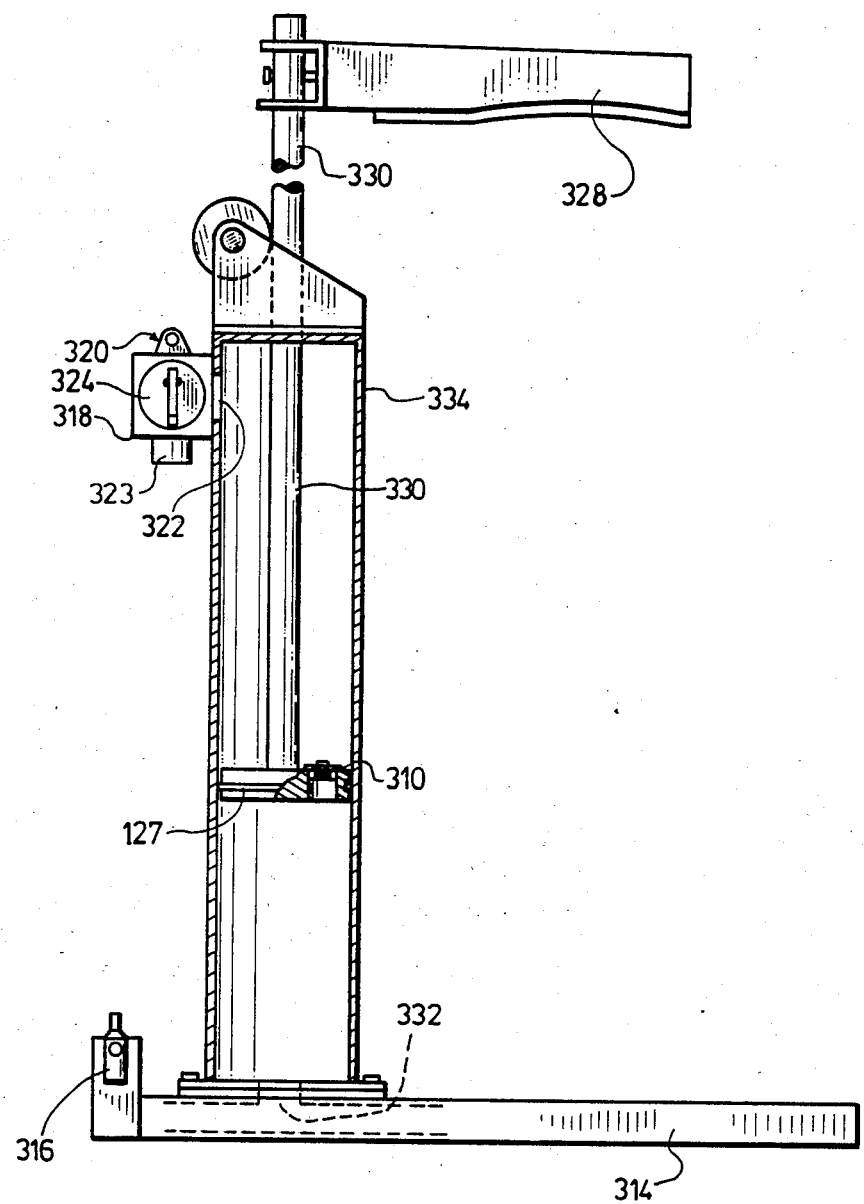
FIG. 13 is a side sectional view of a leg exercise device using the vacuum principal, with the valve module of the present invention.

A yet still further application of the valve module is in a leg exercise device based on the vacuum principle. As shown in FIG. 13, a rubber valve disc mount 310 is mounted in the piston seal 127. A vacuum reduction valve 316 (which is identical to the pressure release and priming entire unit 20) is mounted on one end of the stand 314. The valve module 318 has a first conduit 322 and a second conduit 323 and is controlled by handle 320. A priming intake valve unit 324 is affixed to one side of the module 318.

In this embodiment, in the priming position, shoulder rests 328 are moved upwardly by the operator which forces the rubber valve disc 30 away from its resting position thus, expelling the air through channels 34 through conduit 323, where it is expelled to the exterior environment.

As the shoulder rests are forced downwardly, the rubber valve disc 30 closes hereby preventing any air from the outside from entering the system. As the piston 330 moves downwardly, a progressively larger vacuum is created in the chamber above the piston seal 127 then exists below the seal. The piston seal 127 carries a rubber disc mount 310 which is carried to open and which allows the air in the storage base in stand 314 to pass up into the work cylinders 334 through the orifice 332 connecting the work cylinder 334 to the stand 314. As the shoulder rests are raised again, this causes more air to be expelled from the system.

In operation, as the shoulder rests 328 are raised, air is expelled from the system. As the shoulder rests are lower, the air pressure is equalized by the action of the rubber disc mount 310. Thus, as the device is used, the vacuum inside is built up and the exercise works against such a vacuum. In order to release the vacuum in the system, the vacuum reduction valve 316 is opened thus allowing air to enter the device and the vacuum is thereby reduced.

As is seen from the foregoing disclosure, the new valve module of the present invention is inventive itself as well as the new exercise devices in which it may be incorporated. Thus, while the disclosure illustrates and describes several preferred embodiments, it is to be understood that the invention is not so restricted.

What we claim is:

1. A valve module for use with an exercise device, said valve module comprising a housing having a centre axis, and entrance conduit to allow air to enter the valve module; an exit conduit to allow air to exit from the valve module; a pair of valves to control the flow of air through the module, said valves being rotable about said axis; said housing having a rotatable seat which divides the housing into a first chamber which communicates with the extrance conduit and a second chamber which communicates with the exit conduit or which is sealed from either chamber depending upon the orientation of the rotatable seat; said seat having a first vented valve disc mount contained within the housing and a second vented valve disc mount perpendicular to said first valve disc mount and flush with the housing; said first valve of said pair of valves comprising said vented valve disc mount and a rubber valve disc secured to one surface of said mount; said second valve comprising a pressure release and priming intake valve unit which comprises a second rubber valve disc secured to said second vented disc valve mount; and an air pressure release means mounted on said seat and communicating with one of the vents in the second vented disc valve mount.

2. In an exercise device which provides for isometric, eccentric and concentric contractions of muscles, and which provides for differing velocities of exercise movement, said device comprising a work cylinder, a storage cylinder, a connecting valve module for providing an uninterrupted flow of air between the work cylinder and the storage cylinder thereby providing a self-contained pressurized system, said valve module adapted to vary the resistance to exercise movement and to release air to the atmosphere; and an actuating means, the improvement wherein said valve module comprises a housing having a centre axis, at least one entrance conduit to allow air to enter the valve module, at least one exit conduit to allow air to exit from the valve module, and a pair of valves to control the flow of air through the module; said valves being rotable about said axis; said housing having a rotatable seat which divides the housing into a first chamber which communicates with the entrance conduit and a second chamber which communicates with the exit conduit or which is sealed from either chamber depending upon the orientation of the rotatable seat; said seat having a first vented valve disc mount contained within the housing and a second vented valve disc mount perpendicular to said first valve disc mount and flush with the housing; said first valve of said pair of valves comprising said vented valve disc mount and a rubber valve disc secured to one surface of said mount; said second valve comprising a pressure release and priming intake valve unit which comprises a second rubber valve disc secured to said second vented disc valve mount; and an air pressure release means mounted on said seat and communicating with one of the vents in the second vented disc valve mount.

3. An exercise device which provides for isometric, eccentric and concentric contractions of muscles, and which provides for differing velocities of exercise movement, said device comprising a work cylinder, a storage cylinder, a connecting valve module for providing an uninterrupted flow of air between the work cylinder and the storage cylinder thereby providing a self-contained pressurized system, said valve module adapted to vary the resistance to exercise movement and to release air to the atmosphere, and an actuating means, said module comprising a housing having a centre axis;

an entrance conduit to allow air to enter the valve module;

an exit conduit to allow air to exit from the valve module;

a pair of valves to control the flow of air through the module, said valves being rotatable about said axis;

said housing having a rotatable seat which divides the housing into a first chamber which communicates with the entrance conduit and a second chamber which communicates with the exit conduit or which is sealed from either chamber depending upon the orientation of the rotatable seat;

said seat having a first vented valve disc mount contained within the housing and a second vented valve disc mount perpendicular to said first valve disc mount and flush with the housing;

said first valve of said pair of valves comprising said vented valve disc mount and a rubber valve disc secured to one surface of said mount; said second valve comprising a pressure release and priming intake valve unit which comprises a second rubber valve disc secured to said second vented disc valve mount; and an air pressure release means mounted on said seat and communicating with one of the vents in the second vented disc valve mount.

4. A leg stengthening apparatus which comprises an air reservoir which comprises a stand having an air pocket therein, and an elongated tube in communication with said pocket;

a valve means which comprises a valve module comprising a housing having a centre axis; an entrance conduit to allow air to enter the valve module, an exit conduit to allow air to exit from the valve module; a pair of valves to control the flow of air through the module, said vlaves being rotable about said axis; said housing having a rotatable seat which divides the housing into a first chamber which communicates with the entrance conduit and a second chamber which communicates with the exit conduit or which is sealed from either chamber depending upon the orientation of the rotatable seat; said seat having a first vented valve disc mount contained within the housing and a second vented valve disc mount perpendicular to said first valve disc mount and flush with the housing; said first valve of said pair of valves comprising said vented valve disc mount and a rubber valve disc secured to one surface of said mount; said second valve comprising a pressure release and priming intake valve unit which comprises a second rubber valve disc secured to said second vented disc valve mount; and an air pressure release means mounted on said seat and communicating with one of the vents in the second vented disc valve mount;

said cylinder in communication with said valve means and having a piston slidably disposed therein, and piston comprising a piston rod and a seal, said piston rods extending marginally beyond the top of the cylinder;

actuating means adjustably secured to the rod, said actuating means comprising a pair of padded shoulder rests adjustably secured to said rod.

5. An apparatus as claimed in claim 4 further including an air pressure gauge mounted on said cylinder.

6. A leg stengthening apparatus which provides for isometric, eccentric and concentric contractions of muscles, and which provides for differing velocities of exercise movement, which comprises an air reservoir;

a valve means for controlling the flow of air into and out of said reservoir; said valve means comprising a housing having a centre axis, at least one entrance conduit to allow air to enter the valve means, at least one exit conduit to allow air to exit from the valve means, and a pair of valves to control the flow of air through the valve means, said valves being rotatable about said axis; said housing having a rotatable seat which divides the housing into a first chamber which communicates with the entrance conduit and a second chamber which communicates with the exit conduit or which is sealed from either chamber depending upon the orientation of the rotatable seat; said seat having a first vented valve disc mount contained within the housing and a second vented valve disc mount perpendicular to said first valve disc mount and flush within the housing; said first valve of said pair of valves comprising said vented valve disc mount and a rubber valve disc secured to one surface of said mount; said second valve comprising a pressure release and intake valve unit which comprises a second rubber valve disc secured to said second vented disc valve mount; and an air pressure release means mounted on said seat and communicating with one of the vents in the second vented disc valve mount; and valve means adapted to vary the resistance to exercise movement and to release air to the atmosphere;

a cylinder in communication with said valve means, said cylinder having a piston slidably disposed therein;

actuating means adjustably secured to said piston, said valve means thus providing an uninterrupted flow of air between said air reservoir and said cylinder thereby providing a self-contained pressurized system.

7. An apparatus as claimed in claim 6 wherein said cylinder is in communication with said air reservoir.

8. An apparatus as claimed in claim 7 wherein said piston includes a valve to allow one-way passage of air therethrough, said air passing from the air reservoir to said valve means.

9. An apparatus as claimed in claim 8 further including a release valve on said air reservoir.

10. An apparatus as claimed in claim 6 wherein said air reservoir comprises a stand and an elongated tube in communication therewith.

11. An apparatus as claimed in claim 10 wherein said stand has in internal pocket for retention of air which is in communication with said tube.

12. An apparatus as claimed in claim 10 wherein said cylinder is secured to said stand.

13. An apparatus as claimed in claim 12 wherein said cylinder is secured to said stand by a plurality of mounting bolts which extends through a mounting plate mounted on the bottom of the cylinder and into a corresponding mounting plate on the top of said stand.

14. An apparatus as claimed in claim 10 wherein said valve means further comprises a handle adapted to operate said valve means and a connecting tube connecting said valve means to said cylinder.

15. An apparatus as claimed in claim 14 wherein said piston comprises a piston rod and a seal, said piston rod extending beyond the top of said cylinder.

16. An apparatus as claimed in claim 15 further including guide means to guide the movement of said piston rod.

17. An apparatus as claimed in claim 16 wherein said guide means comprises a wheel mounted in a wheel housing, said wheel adapted to guide the movement of said piston rod.

18. An apparatus as claimed in claim 15 wherein said actuating means is adjustably secured to said piston rod.

19. An apparatus as claimed in claim 18 wherein said actuating means comprises a pair of shoulder rests secured to said rod by an adjustable bracket.

20. An apparatus as claimed in claim 19 wherein said shoulder rests are padded.

21. An apparatus as claimed in claim 14 wherein said handle is adapted to move said valve means from a priming position to an operating position or from an operating position to a priming position.

22. An apparatus as claimed in claim 21 wherein said valve means is adapted to reversibly move from a position communicating with said cylinder by said connecting tube to said elongated tube, to a non-communicating position.

* * * * *